(12) United States Patent
Fang et al.

(10) Patent No.: US 6,777,929 B2
(45) Date of Patent: Aug. 17, 2004

(54) CROSS TALK BIT ERROR RATE TESTING OF A MAGNETIC HEAD

(75) Inventors: Peter Cheng-I Fang, San Jose, CA (US); Terence Tin-Lok Lam, Cupertino, CA (US); Zhong-heng Lin, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 10/229,459

(22) Filed: Aug. 27, 2002

(65) Prior Publication Data

US 2004/0041559 A1 Mar. 4, 2004

(51) Int. Cl.⁷ .............................................. G01R 33/12
(52) U.S. Cl. ...................... 324/210; 360/31; 369/53.38
(58) Field of Search .............................. 360/25, 31, 48, 360/53, 54, 75, 313, 317; 369/53.38, 53.1; 324/210, 211, 212, 252

(56) References Cited

U.S. PATENT DOCUMENTS

| | | | |
|---|---|---|---|
| 5,121,263 A | 6/1992 | Kerwin et al. | 360/53 |
| 5,134,533 A * | 7/1992 | Friedrich et al. | 360/324 |
| 5,206,853 A | 4/1993 | Tanaka | 369/54 |
| 5,461,517 A | 10/1995 | Suda et al. | 360/53 |
| 5,523,898 A | 6/1996 | Jove et al. | 360/66 |
| 5,568,395 A | 10/1996 | Huang | 364/489 |
| 5,592,341 A * | 1/1997 | Hadfi | 360/46 |
| 5,661,614 A | 8/1997 | Wallash et al. | 360/66 |
| 5,696,641 A | 12/1997 | Bailey | 360/66 |
| 6,111,406 A * | 8/2000 | Garfunkel et al. | 324/210 |
| 6,195,215 B1 | 2/2001 | Yanagimoto et al. | 360/25 |
| 6,249,392 B1 | 6/2001 | Sacks et al. | 360/31 |
| 6,249,394 B1 | 6/2001 | Li et al. | 360/31 |

FOREIGN PATENT DOCUMENTS

EP      0447246 A2    9/1991    ........... G11B/5/012

OTHER PUBLICATIONS

Norwood, R.E.; "Damped Head Arm," IBM Technical Disclosure Bulletin, Vo. 21, No. 8 Jan. 1979.

Belleson, J.G. et al; "Read Instability for the Magneto-Optical Media," IBM Technical Disclosure Bulletin, vol. 34, No. 2, Jul. 1991.

IBM Patent Application entitled, "Method and Apparatus for Testing MR Head Instability Using a Criterion that Removes Normal Head Fluctuation From Consideration", U.S. application 09/452,651, Now 6,519,108.

* cited by examiner

Primary Examiner—Jay Patidar
(74) Attorney, Agent, or Firm—Silicon Valley IP Group, PC; Dominic M. Kotab (57) ABSTRACT

A process, computer program product, and apparatus for detecting and quantifying crosstalk instability in a read/write mechanism are provided. A write current is varied in a write circuit for exciting the write head. Measurements are taken of a magnetoresistive impedance of a read current of a read circuit. Measurements are also taken of a signal amplitude in the read circuit. A bit error rate of the overall system is also measured. The read/write mechanism is failed if the signal amplitude changes by a predetermined amount during the varying of the write current. Likewise, the read/write mechanism is failed if the error rate changes by a predetermined amount during the varying of the write current. The write-to-read signal coupling of HGA (Head Gimbal Assembly) and HSA (Head Stack Assembly), including GMR sensor, suspension and flex cable on the actuator arm, can be evaluated at component design level. The methodologies successfully simulate GMR cross talk instability inside a drive on magnetic testers. Therefore, a good prediction of drive failure rate can be achieved.

22 Claims, 8 Drawing Sheets

FIG. 1

(PRIOR ART)

FIG. 2

(PRIOR ART)

Product A, Head 1

| Revolution (K) | TAA (mV, PCTR) | BER (2T) |
|---|---|---|
| 0 | 231.6 | 8.0 |
| 125 | 190.9 | 8.0 |
| 250 | 117.5 | 4.5 |
| 375 | 89.6 | 4.3 |
| 500 | 81.0 | 3.6 |
| 625 | 75.4 | 3.1 |
| 750 | 54.7 | 0.48 |

FIG. 8A

| Revolution (K) | Product A, Head 2 TAA (mV) | Product A, Head 2 BER (2T) | Product B TAA (mV) | Product B BER (2T) |
|---|---|---|---|---|
| 0 | 265.1 | 8.0 | 299.1 | 8.0 |
| 50 | 218.0 | 6.0 | 297.7 | 8.0 |
| 100 | 175.5 | 6.0 | 292.0 | 8.0 |
| 150 | 137.2 | 4.4 | 295.5 | 8.0 |
| 200 | 83.7 | 1.7 | 306.3 | 8.0 |
| 250 | 74.1 | 2.4 | 298.6 | 8.0 |
| 300 | 49.4 | 0.48 | 298.5 | 8.0 |
| 350 | 44.8 | | 303.8 | 8.0 |
| 400 | 40.4 | | 302.9 | 8.0 |
| 450 | 37.4 | | 300.6 | 8.0 |
| 500 | 37.2 | | 299.7 | 8.0 |

CROSS TALK BIT ERROR RATE TESTING OF A MAGNETIC HEAD

FIELD OF THE INVENTION

The present invention relates to data storage devices, and more particularly, this invention relates to testing for cross talk instability in magnetic heads and associated hardware.

BACKGROUND OF THE INVENTION

In a disk drive the MR head is mounted on a slider which is connected to a suspension arm, the suspension arm urging the slider toward a magnetic storage disk. When the disk is rotated the slider flies above the surface of the disk on a cushion of air which is generated by the rotating disk. The MR head then plays back recorded magnetic signals (bits) which are arranged in circular tracks on the disk.

The MR sensor is a small stripe of conductive ferromagnetic material, such as Permalloy (NiFe), which changes resistance in response to a magnetic field such as magnetic flux incursions (bits) from a magnetic storage disk. The conventional MR sensor operates on the basis of the anisotropic magnetoresistive (AMR) effect in which a component of the read element resistance varies as the square of the cosine of the angle between the magnetization in the read element and the direction of sense current flowing through the read element. Recorded data can be read from a magnetic medium because the external magnetic field from the recorded medium (the signal field) causes a change in the direction of magnetization in the read element, which in turn causes a change in resistance in the read element and a corresponding change in the sensed current or voltage. Conventional MR sensors based on the AMR effect thus provide an essentially analog signal output, where the resistance and hence signal output is directly related to the strength of the magnetic field being sensed.

Figure 1:
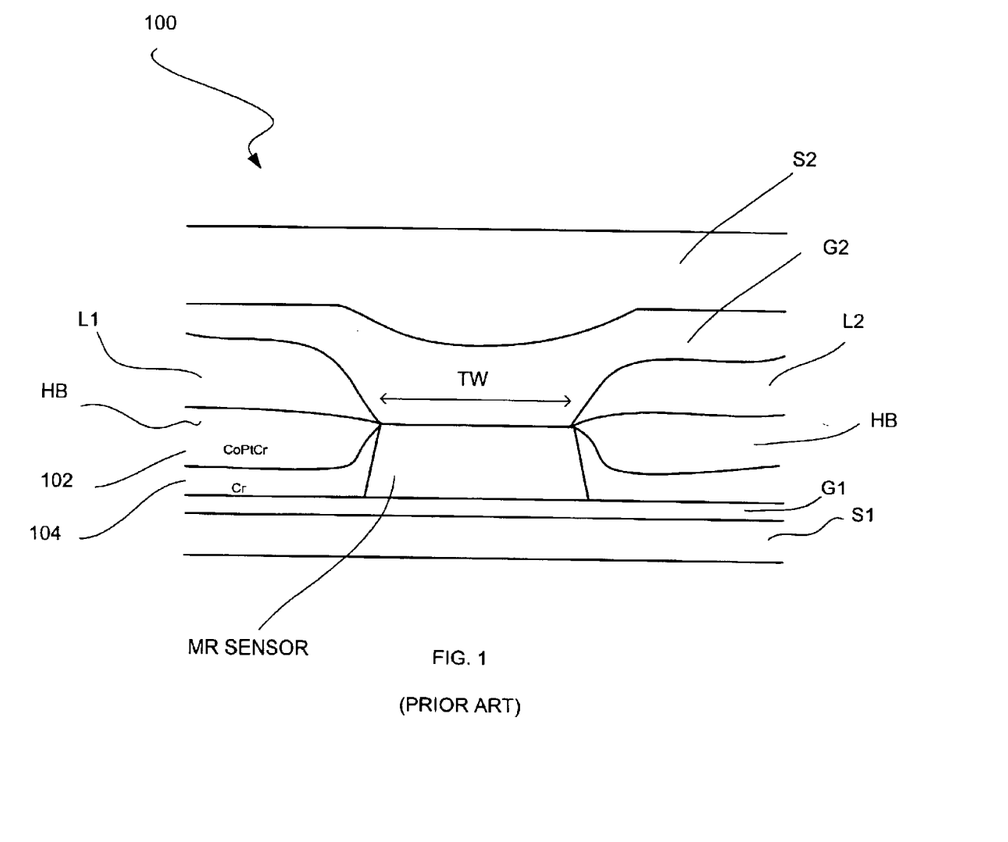
FIG. 1 illustrates a cross-sectional view of an MR head, in accordance with the prior art.

FIG. 1 illustrates a cross-sectional view of an MR head 100, in accordance with the prior art. As shown, the MR read head 100 includes an MR sensor which is sandwiched between a hard bias layer HB which is in turn sandwiched between first and second shield layers S1 and S2, with insulating gap layers G1 and G2 separating the sensor and the shield layers. The hard bias layer HB typically includes an upper layer 102 and a seed layer 104 therebeneath. One exemplary material commonly employed for the upper layer 102 is CoPtCr with the seed layer being constructed with Cr.

Lead layers L1 and L2 are sandwiched between the hard bias layer HB and shield layer S2 for providing a sense current to the MR sensor. Magnetic fields from a magnetic disk change the resistance of the sensor procircuital to the strength of the fields. The change in resistance changes the potential across the MR sensor which is processed by channel circuitry as a readback signal.

The MR read head 100 is typically mounted to a slider which, in turn, is attached to a suspension and actuator of a magnetic disk drive. The slider and edges of the MR sensor and other layers of the MR read head 100 form an air bearing surface (ABS). When a magnetic disk is rotated by the drive, the slider and one or more heads are supported against the disk by a cushion of air (an "air bearing") between the disk and the ABS. The air bearing is generated by the rotating disk. The MR read head 100 then reads magnetic flux signals from the rotating disk.

Figure 2:
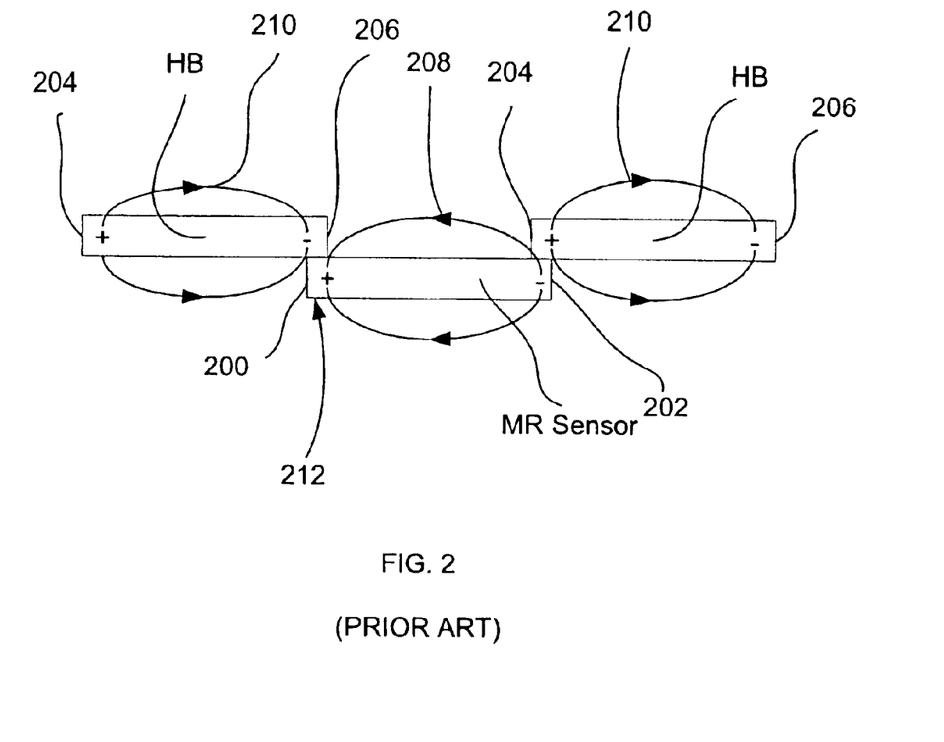
FIG. 2 illustrates a simplified cross-sectional view of the MR head showing the hard bias layer and the MR sensor thereof.

FIG. 2 illustrates a simplified cross-sectional view of the MR head 100 showing the hard bias layer HB and the MR sensor thereof. It should be noted that such simplified illustration is not drawn to scale, and includes crude blocks to simplistically show the overlap between the MR sensor and the hard bias layer HB, and the associated fields.

As shown FIG. 2, the hard bias layer HB includes positive poles 204 and negative poles 206. In use, the positive poles 204 and negative poles 206 of the hard bias layer HB produce first electromagnetic fields 208 in a first direction, and further produce a second electromagnetic field 210 in a second direction.

A different and more pronounced magnetoresistance, called giant magnetoresistance (GMR), has been observed in a variety of magnetic multilayered structures, the essential feature being at least two ferromagnetic metal layers separated by a nonferromagnetic metal layer. This GMR effect has been found in a variety of systems, such as Fe/Cr, Co/Cu, or Co/Ru multilayers exhibiting strong antiferromagnetic coupling of the ferromagnetic layers. This GMR effect has also been observed for these types of multilayer structures, but wherein the ferromagnetic layers have a single crystalline structure and thus exhibit uniaxial magnetic anisotropy, as described in U.S. Pat. No. 5,134,533 and by K. Inomata, et al., J. Appl. Phys. 74 (6), Sep. 15, 1993. The physical origin of the GMR effect is that the application of an external magnetic field causes a reorientation of all of the magnetic moments of the ferromagnetic layers. This in turn causes a change in the spin-dependent scattering of conduction electrons and thus a change in the electrical resistance of the multilayered structure. The resistance of the structure thus changes as the relative alignment of the magnetizations of the ferromagnetic layers changes. MR sensors based on the GMR effect also provide an essentially analog signal output.

In high density disk drives bits are closely spaced linearly about each circular track. In order for the MR head to playback the closely spaced bits the MR head has to have high resolution. This is accomplished by close spacing between the first and second shield layers, caused by thin first and second gap layers, so that the MR sensor is magnetically shielded from upstream and downstream bits with respect to the bit being read.

An MR head is typically combined with an inductive write head to form a piggyback MR head or a merged MR head. In either head the write head includes first and second pole pieces which have a gap at a head surface and are magnetically connected at a back gap. The difference between a piggyback MR head and a merged MR head is that the merged MR head employs the second shield layer of the read head as the first pole piece of the write head. A conductive coil induces magnetic flux into the pole pieces, the flux flinging across the gap and recording signals on a rotating disk. The write signals written by the write head are large magnetic fields compared to the read signals shielded by the first and second shield layers. Thus, during the write operation a large magnetic field is applied to one or more of the shield layers causing a dramatic rotation of the magnetic moment of the shield layer.

Magnetic recording data storage technologies, particularly magnetic disk drive technologies, have undergone enormous increases in stored data per unit area of media (areal data density). This has occurred primarily by reducing the size of the magnetic bit through a reduction in the size of the read and write heads and a reduction in the head-disk spacing.

However, sometimes the disk drive exhibits irregularities, such as failed reads and/or writes. Often, a manufacturer will have produced hundreds or thousands of drives before the problem is known. The result is that an entire product line may have to be discarded.

For example, it has been found that some AMR and/or GMR heads exhibit instability such that data cannot be properly read from the disk. One cause of instability is thermal stress caused by transient pulses inside the reader induced by the AC write current inside the writer through inductive and capacitive coupling. This phenomenon is called cross talk instability.

During writing, a write current waveform is applied. As the current changes during writing, a magnetic and electric field is generated, not only at the write head, but also at traces within the suspension interconnect coupling the head to the drive preamp. The change in the magnetic field and line voltage gets coupled to the read circuit, causing crosstalk spikes in the read circuit. These spikes create noise in the read signal, leading to errors. Even worse is that the thermal power of these spikes will cause permanent damage of the reader sensor and result in degradation of signal amplitude and bit error rate. This degradation is called crosstalk instability.

The prior art has attempted to detect and measure cross talk instability. U.S. Pat. Nos. 5,121,263 and 5,206,853 perform such methods on an assembled hard drive. These methods require the head to repeatedly read and write test data to the drive medium. The disadvantage of such systems is that the test can only be performed on a fully functional drive.

U.S. Pat. Nos. 5,568,395 attempts to solve the problem by estimating crosstalk using Computer Aided Design (CAD) during the design phase. The problem with this method is that the results are inaccurate, in that it does not test the performance of the actual heads. Further, this method fails to account for variations in materials used to construct the heads, actual (vs. estimated) conductive and shielding properties of the various components, etc.

What is needed is a method of testing of actual heads outside the drive so that problems can be detected and resolved prior to manufacture of complete disk drives. What is further needed is a way to test reader instability caused by writer excitation, and more particularly, instability caused by cross talk instability.

What is also needed is a way to test heads at a component level, thereby overcoming the prior art problem of being unable to qualify a head at a component level after design due to having to test inside the drive. Such prior art approach does not accurately identify whether the head, suspension interconnect, disk media, etc. is the problem.

DISCLOSURE OF THE INVENTION

A process, computer program product, and apparatus for testing a read/write mechanism are provided. The read/write mechanism includes a read circuit and a write circuit. The read circuit includes a read portion of a head and/or associated electrical coupling. The write circuit includes a write portion of a head and/or associated electrical coupling. The read/write mechanism is coupled to an external (hardware or software) module, which sends write signals to the write circuit. The write signals vary the write current in a write circuit of a read/write mechanism for exciting the write circuit. This creates spikes in the read circuit, which can cause instability. The write current can be varied at predetermined intervals based on a pattern. Note that the intervals need not be uniform, and can be selected randomly. The write current can also be varied randomly to resemble a random pattern. Further, the write current can be toggled on and off. This can be done via a gate, and can be based on a pattern or toggled randomly. Additionally, a bias of the read circuit can be changed.

Measurements are taken of a magnetoresistive impedance of a read current of a read circuit of the read/write mechanism. Measurements are also taken of a signal amplitude in the read circuit. The signal amplitude measured may be a track average amplitude (TAA). A bit error rate of the read circuit, and preferably of the overall system, is also measured. The foregoing operations can be repeated for multiple cycles prior to continuing with the process. Further, the foregoing operations may be performed in varying orders of progression.

The read/write mechanism is failed if the signal amplitude changes by a predetermined amount during the varying of the write current. Likewise, the read/write mechanism is failed if the bit error rate changes by a predetermined amount during the varying of the write current. The read/write mechanism may also be failed if the magnetoresistive impedance changes by a predetermined amount during the varying of the write current.

The write-to-read signal coupling of HGA (Head Gimbal Assembly) and HSA (Head Stack Assembly), including GMR sensor, suspension and flex cable on the actuator arm, can be evaluated at component design level. The methodologies successfully simulate GMR cross talk instability inside a drive on magnetic testers. Therefore, a good prediction of drive failure rate can be achieved.

Thus, methodologies described herein overcome the limitations of the prior art by simulating data at the component level for testing one head. Further, these methodologies make it easier to perform failure analysis and find the cause of problems. Because the tests can be performed on the head assembly itself, they are easier to perform. Otherwise the hard drive would have to be programmed to perform the test, which is very difficult. Moreover, some hard drives are limited in the maximum frequencies that can be achieved, so the head may perform differently on other drives. Thirdly, the methodologies allow a user to evaluate a new design and predict the failure possibility in a drive prior to installation in a complete drive, thereby saving considerable time, expense, and human resources.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 3:
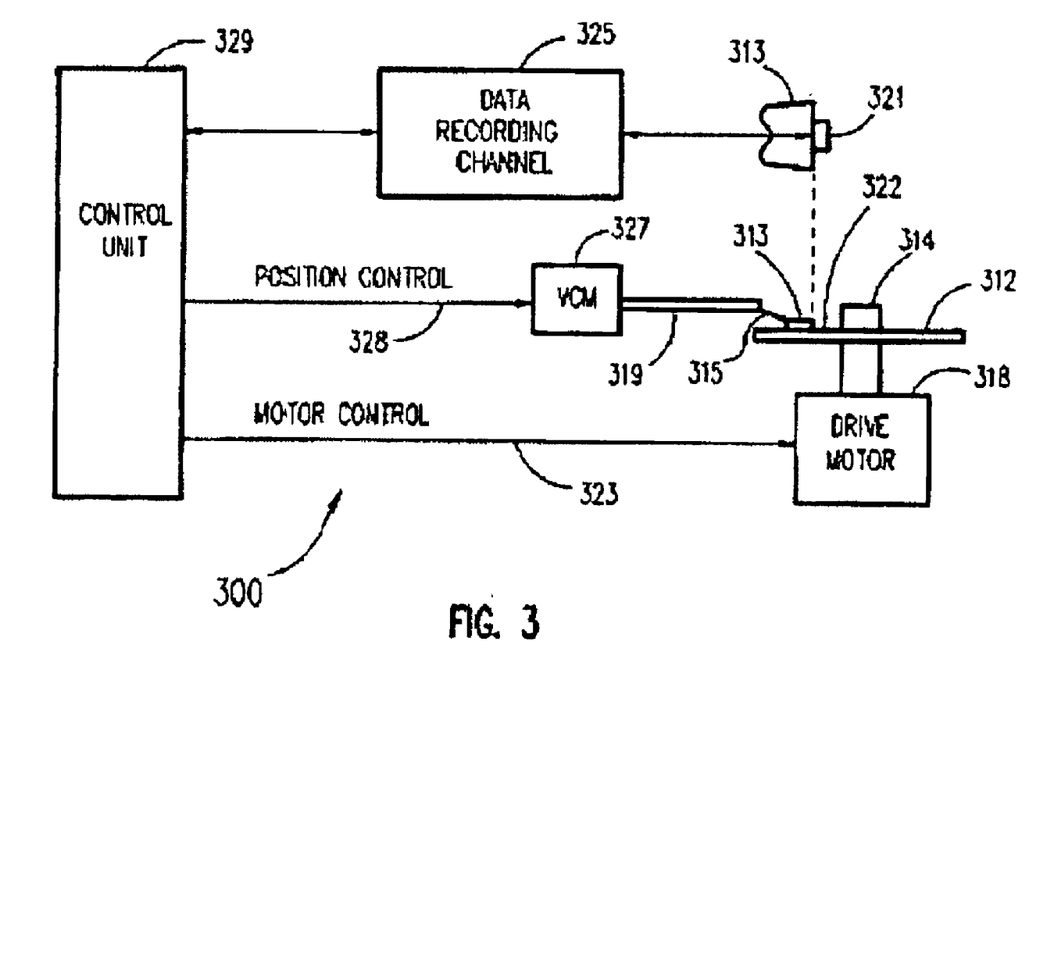
FIG. 3 is a perspective drawing of a magnetic recording disk drive system in accordance with one embodiment.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312.

At least one slider 313 is positioned on the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different tracks of the disk where desired data are recorded. Each slider 313 is attached to an actuator arm 319 by way of a suspension 315. The suspension 315 provides a slight spring force which biases slider 313 against the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

Figure 4:
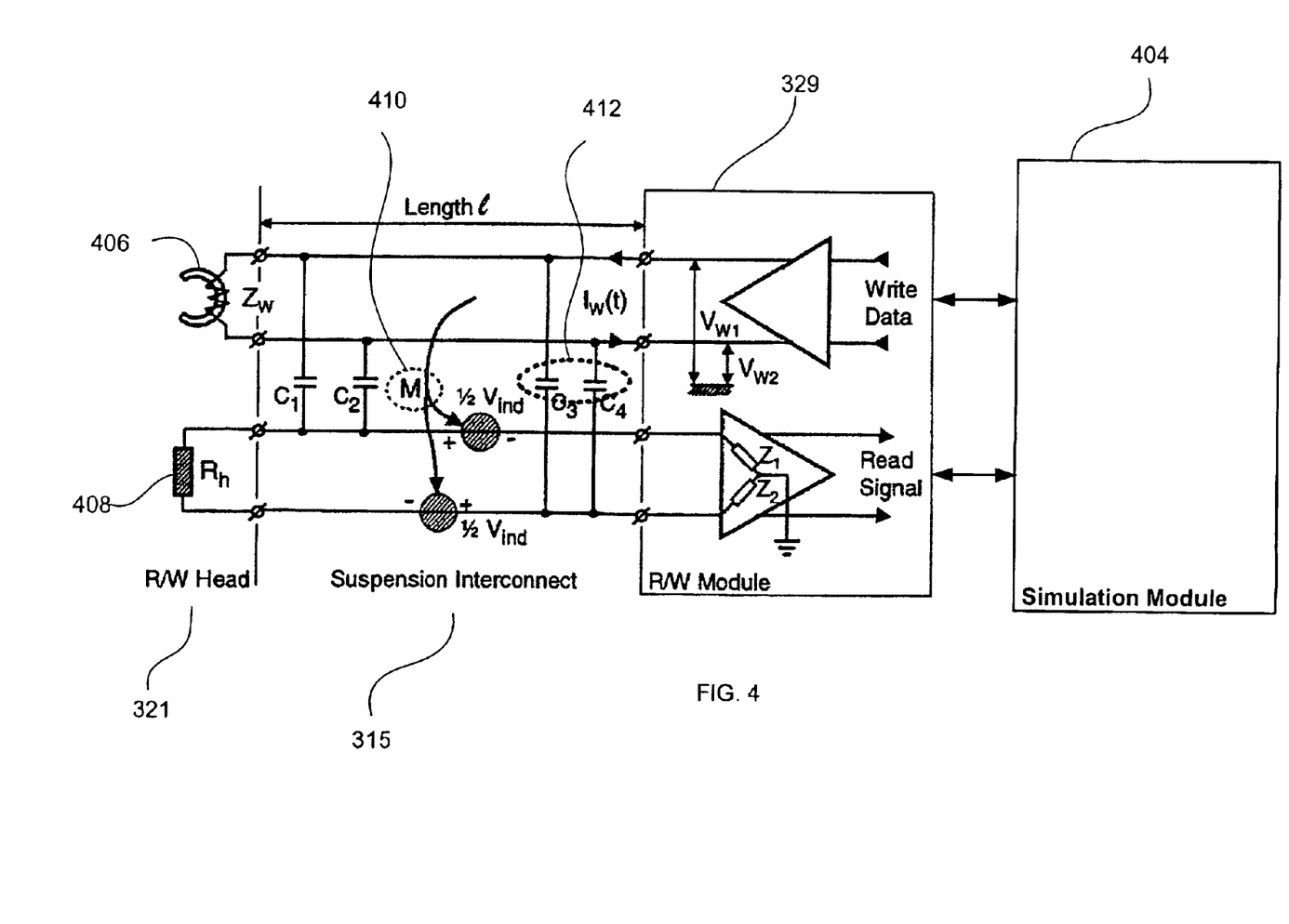
FIG. 4 illustrates a system for testing the ability of a read/write device to withstand and function properly in spite of the magnetic and electrical coupling that occurs during writing and reading, according to one embodiment.

FIG. 4 illustrates a system for testing the ability of a read/write device (magnetic head and/or associated hardware/electrical coupling) to function acceptably in spite of the magnetic and electrical coupling that occurs during writing and reading, according to one embodiment. As shown, a read/write head 321 and suspension interconnect 315 are operatively coupled to a control unit 329.

A simulation module 404 simulates a drive by applying voltage pulses to the write circuit, and thus the write portion 406 of the head 321, during a write cycle simulation. In addition, the simulation module 404 monitors signals received from the read portion 408 of the head 321 during the simulation to generate test data, and applies test algorithm(s) to the test data.

Note that the simulation module 404 can be coupled directly to the head 321 and/or suspension interconnect 315, or can send the signals via the control unit 329. Note also that the control unit 329 can operate as the simulation module. Preferably, the simulation module 404 is connected to the head 321 at the gimbal stage of production, prior to attachment of the gimbal to a drive assembly. The simulation module 404 is thus able to simulate write head excitation from outside the head for spot testing and early detection of problems with the read/write circuitry. Further, the simulation module 404 can be used to test an assembled drive.

Figure 5:
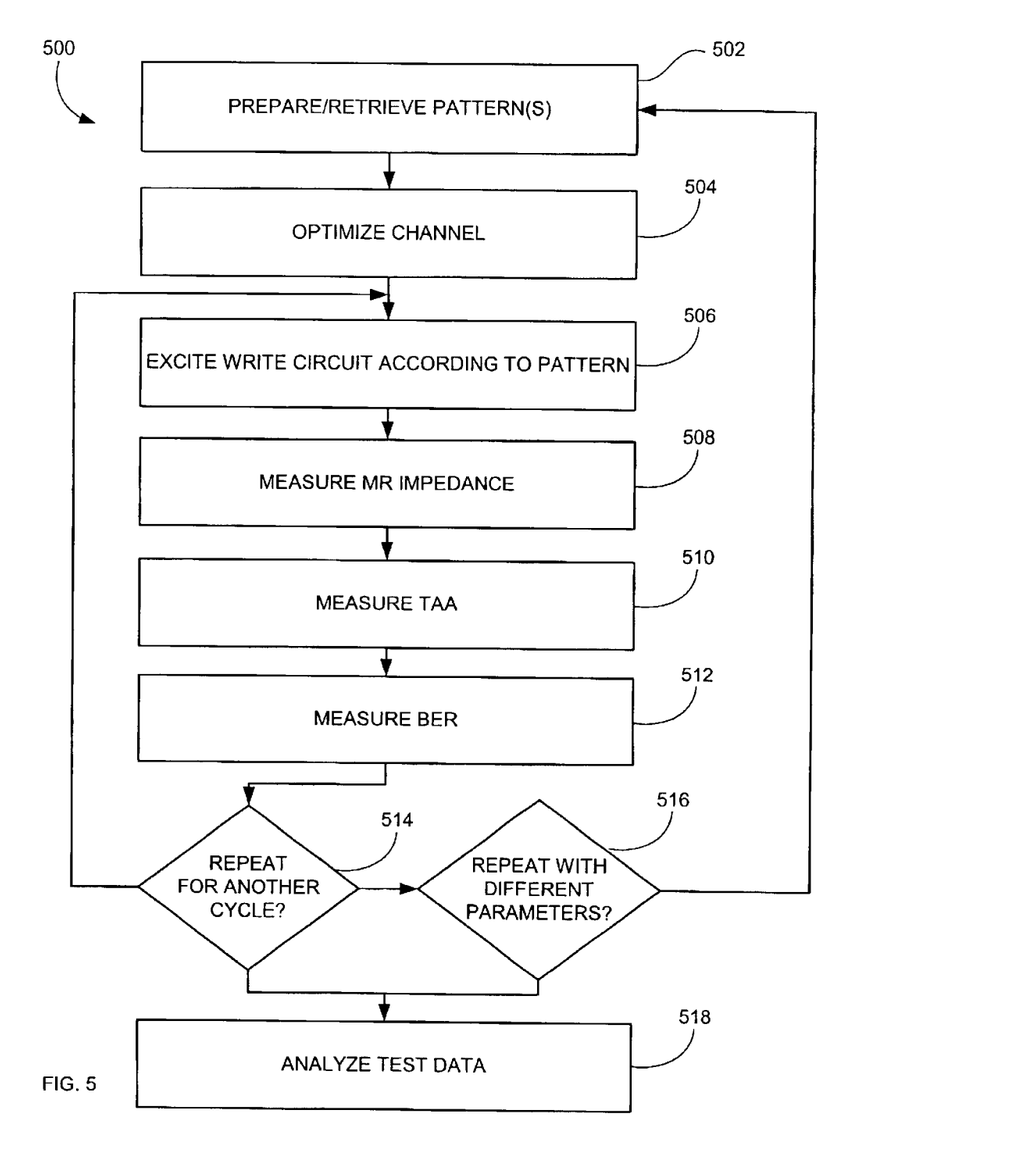
FIG. 5 is a flow diagram of a process for testing a magnetic head according to one embodiment.

FIG. 5 is a flow diagram of a process 500 for testing a magnetic head according to one embodiment. Preferably, the simulation module 404 utilizes this process 500, at least in part, when analyzing the magnetic head.

As discussed above, the module 404 sends write signals. In preparation for the test, one or more patterns are created and/or retrieved during testing. Note operation 502. The pattern indicates the number of pulses, increments, durations, etc. for these write signals.

In normal operation, when a read head reads a disk, it creates a signal (which is in the form of a waveform with pulses (representing 0s and 1s)). This signal is sent to a channel to recover the 0 and 1s of a binary sequence.

The simulation module 404 can also use a channel to recover simulated read data. In operation 504 of FIG. 5, a channel is optimized, preferably to function similar to the channel on the target drive (i.e., drive being simulated). Noise filtering, pulse shaping, etc. are performed in the channel to make a best guess as to which portions of the signals are pulses. For example, pseudo random patterning can be used to analyze a noisy signal and make a "best guess" as to which portions of the signal represent 0s and 1s. Partial Response, Maximum Likelihood (PRML) is another method to filter a signal with a lot of noise. One skilled in the art will appreciate that any suitable mechanism can be used to optimize the channel.

In operation 506, the module 404 excites the write circuit by sending write signals to the write circuit. The write signals follow the pattern(s) prepared in operation 502. The patterned sequence of write signals introduces crosstalk spikes into the read circuitry.

Different patterns can be combined and used to create more strenuous tests. For example the pattern can change from a high frequency pattern to a low frequency pattern. Also, random patterns can be used.

A write gate can be toggled (i.e., turned on-turn off) via a pattern or randomly. Pulses are created as the gate is toggled. As an option, the module 404 can send write signals for an entire revolution (100% write gate), ½ revolution (50% write gate), etc. when toggled on.

Similarly, different sets of write data can be used. The bias of the read and/or write circuit can also be held constant, varied, or nonexistent. Further, the number of revolutions per cycle can be randomly selected.

Further, by changing write parameters, the physical stress on the head is also changed. More particularly, when more spikes are created, more power travels through the head assembly and the hotter it gets. Thermal degradation occurs as the temperature rises. Note that the rate of degradation is proportional to an increase in temperature, i.e., the hotter the head gets, the faster it degrades.

During the simulation, as in actual writing, a magnetic field is generated as the current changes during the simulated writing, not only at the write portion 406 of the head 321, but also at traces within the suspension interconnect 315. The change in magnetic field and line voltage becomes coupled to the read circuit, causing a crosstalk spike in the read circuit, which in turn can cause read errors and damage to the reader. The magnetic field coupling to the read circuit is graphically represented at 410 of FIG. 4.

With continued reference to FIG. 5, in operation 508, the (magnetoresistive) MR impedance is measured. This is the resistance of the read sensor. Inductors couple with the change in magnetic flux that is related to the change in write current. The change in magnetic flux is proportional to the change in current in the write-head wires. The formula for calculating the crosstalk due to magnetic coupling is set forth below.

$$V_{ind} = -N\, d\varnothing/dt = M\, dI_w/dt \qquad \text{Equation 1}$$

where $V_{ind}$=voltage spike induced by the magnetic coupling

N=Number of loops which enclose flux and have contribution to potential $d\varnothing/dt$=change in magnetic flux over time M=mutual inductance between write and read lines, relative to current change $dI_w/dt$=change in write current over time Note that ESD causes increased resistance, but crosstalk may reduce reader resistance.

Similarly, as the write current changes, an electric field is generated at the write portion 406 of the head 321 as well as within the suspension interconnect 315. The electrical coupling is graphically represented at 412. The write signal waveform becomes coupled to the read circuit via a parasitic coupling capacitance, causing a crosstalk spike in the read circuit which, like magnetic coupling, can cause read errors and damage to the reader. More particularly, the capacitor couples a voltage across the two lines. This voltage is proportional to the change in voltage in the write circuit.

The formula for calculating the electrical coupling is set forth below.

$$I_{ind} = C\, dV_w/dt \qquad \text{Equation 2}$$

where $I_{ind}$=current spike induced by capacitive coupling

C=capacitance between write and read lines $dV_w/dt$=change in the write voltage over time Pulse amplitude is another important measurement. In operation 510, the external simulation module 404 measures the Track Average Amplitude (TAA). Measurements TAA+ and TAA− refer to the track-average amplitude, which is the average amplitude of the pulses in a given track on the disk media. The optimal value of this measurement depends on the density of the drive's media and the sensitivity of the read-channel, optimized in operation 504. If the TAA is too high, the magnetic flux from the disk will cause the magnetoresistive (MR) head to saturate, which distorts the waveform that the head sends to the preamp. If the TAA is too low, the channel's SNR will be too low, causing random bit errors.

In operation 512, the bit-error-rate (BER) of the read circuit is measured. The BER is the average rate at which bit errors occur. One skilled in the art will recognize that BER analyzers are known in the art, and that any suitable BER analyzer may be used to obtain the measurement.

The data (measurements) from the current run are collected. For example, after 10,000 revolutions or cycles, the TAA and BER measurements can be taken.

At decision 514, a determination is made as to whether to repeat operations 506–512, and for how many more runs. Note that depending on preference or desired testing, parameters may change from run to run, or they may not. At decision 516, a determination is made as to whether to repeat operations 502–514 with different pattern and/or configuration data. As mentioned above, by changing patterns, results can be obtained for what happens when different write frequencies are applied.

In operation 518, the collected data is analyzed to determine the performance of the read/write mechanism (head 321, interconnect 315, etc.). For example, suppose the module 404 simulates writing for ten cycles of 50,000 revolutions per cycle (500,000 revolutions). If only minor changes are detected after the ten cycles, the read/write mechanism/head is passed. However, if the signal amplitude, error rate, and/or magnetoresistive impedance changes by a predetermined amount during the iterations, the read/write mechanism/head fails.

Figure 6A:
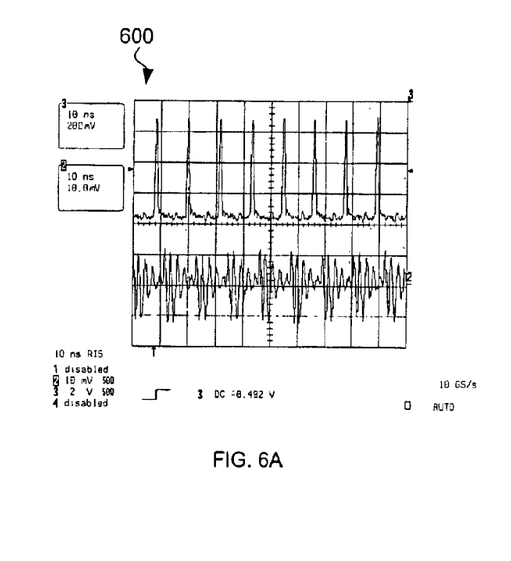
FIGS. 6A–6C depict illustrative charts for transient pulses induced from a write circuit to a read circuit.
Figure 6B:
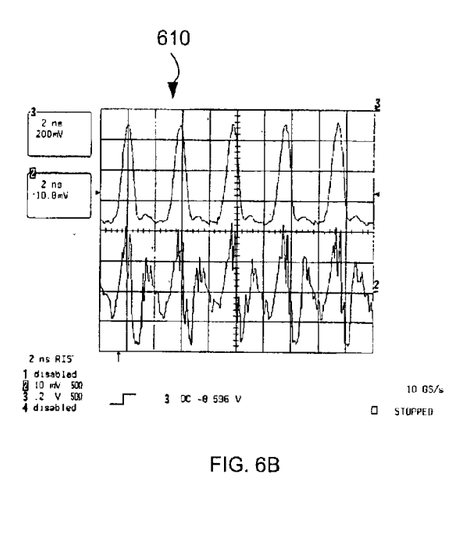
Figure 6C:
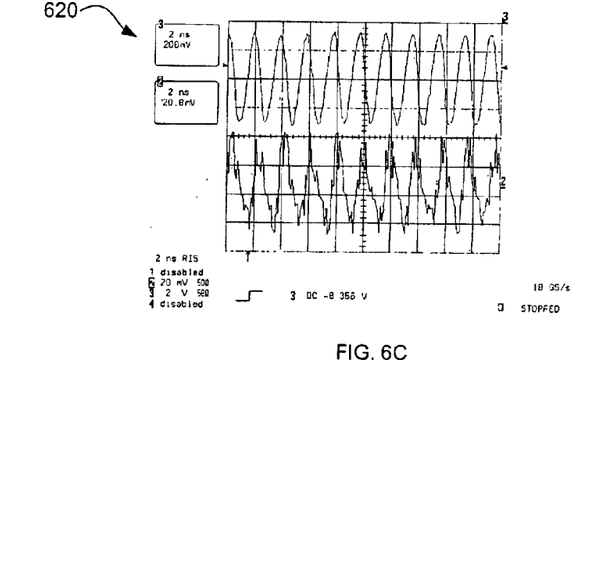

FIGS. 6A–6C depict illustrative charts 600, 610, 620 for transient pulses induced from a write circuit to a read circuit. The bottom curves are the coupled signals from the reader due to write current change. The top curves are write control signal from module 404. The peak positions represent the time when the write current changes polarity; and when in a drive, when a magnetic transition is supposed to be recorded on a disc. In each example the write current is 55 mA. The write pattern in FIG. 6A is LF (low frequency) with a P—P (peak to peak) amplitude of 4.0 mA. The write pattern in FIG. 6B is MF (mid frequency) with a P—P amplitude of 8.8 mA. The write pattern in FIG. 6C is HF (high frequency) with a P—P amplitude of 20.0 mA.

Figure 7A:
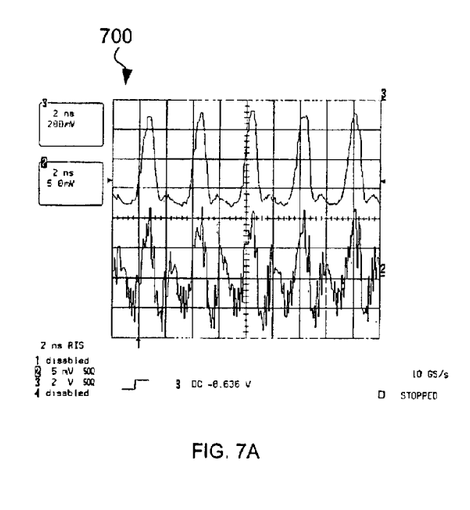
FIGS. 7A–7C depict exemplary charts for transient pulses induced from a write circuit to a read circuit.
Figure 7B:
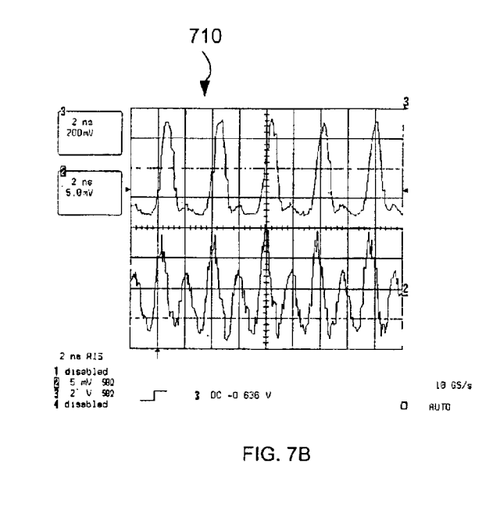
Figure 7C:
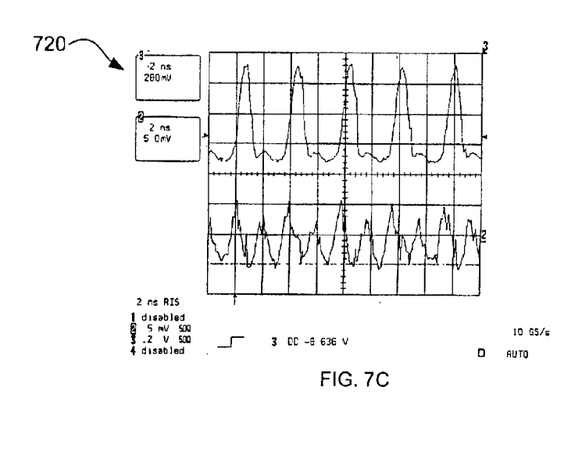

FIGS. 7A–7C depict illustrative charts 700, 710, 720 for transient pulses induced from a write circuit to a read circuit. In each example the write signal is 260 Mflux per second. The write current in FIG. 7A is 55 mA with a P—P amplitude of 4.7 mA. The write current in FIG. 7B is 40 mA with a P—P amplitude of 3.3 mA. The write current in FIG. 7C is 20 mA with a P—P amplitude of 2.6 mA.

Figure 8A:
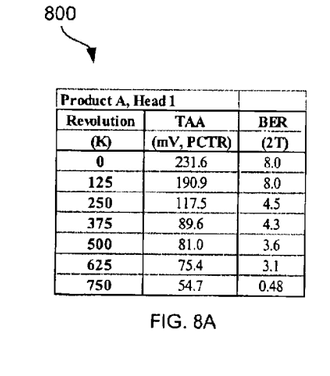
FIG. 8A depicts a table listing illustrative TAA and BER readings after a number of revolutions.
Figure 8B:
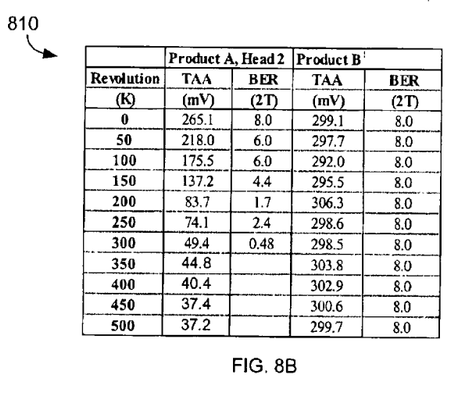
FIG. 8B shows a table listing illustrative TAA and BER readings after a number of revolutions.
Figure 8C:
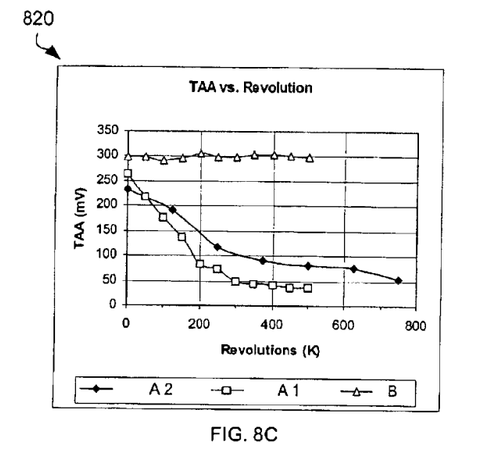
FIG. 8C is a plot of the TAA data from FIGS. 8A–B vs. number of revolutions.
Figure 8D:
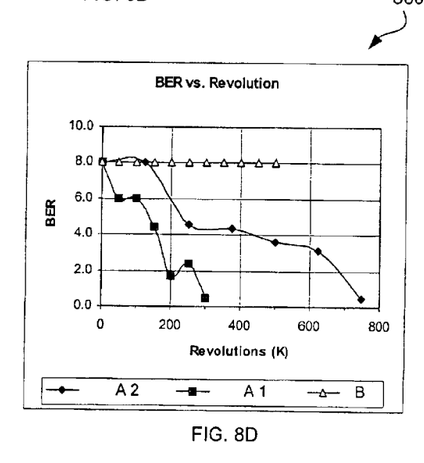
FIG. 8D is a plot of the BER data from FIGS. 8A–B vs. number of revolutions.

FIGS. 8A–B each depict a table 800, 810 listing illustrative TAA and BER readings after a number of revolutions. Exemplary test parameters for the data of FIG. 8A are 750,000 total write revolutions, the read gate is on during writing, and the write gate is toggled off and on once per revolution. FIG. 8C is a plot 820 of the TAA data from FIGS. 8A–B vs. number of revolutions. FIG. 8D is a plot 830 of the BER data from FIGS. 8A–B vs. number of revolutions.

Referring to FIGS. 8B–8C, the curve associated with Product B is for a head from a lower capacity/data rate product, and did not show any change in TAA and BER during 50 K revolutions and indicated no crosstalk instability occurred. The other two curves show severe degradation of TAA and BER and indicate that these two heads from a higher capacity/data rate product suffer crosstalk instability problem. Thus, by performing the process of FIG. 5, a head manufacturer can perform failure analysis of heads, interconnects, etc. to estimate the reliability of the hardware before full-scale production of hard drives. Also, when drives are sent to customers, those customers often perform other tests. The process of FIG. 5 can also be used to test heads from drives that were rejected by customers due to reliability factors, thereby helping to determine the reason for the problem (i.e., studying the head to determine why it failed).

Further, the process of FIG. 5 is easier to perform because it can be performed on the head assembly itself. Otherwise the hard drive itself must be programmed, which is very difficult. Moreover, some hard drives are limited in the maximum frequencies that can be achieved, so the head may perform different on other drives.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A process for testing a read/write mechanism having a read circuit and a write circuit, comprising:
   (a) varying a write current in the write circuit for exciting the write circuit;
   (b) measuring a magnetoresistive impedance of a read current of the read circuit;
   (c) measuring a signal amplitude of the read circuit;
   (d) measuring a bit error rate of the read circuit;
   (e) failing the read/write mechanism if the signal amplitude changes by a predetermined amount during the varying of the write current; and
   (f) failing the read/write mechanism if the error rate changes by a predetermined amount during the varying of the write current.

2. The process as recited in claim 1, further comprising coupling the read/write mechanism to an external module, the external module being for sending write signals to the write circuit for varying the write current.

3. The process as recited in claim 1, wherein the write current is varied at predetermined intervals based on a pattern.

4. The process as recited in claim 1, wherein the write current is varied randomly.

5. The process as recited in claim 1, further comprising changing a bias of the read circuit.

6. The process as recited in claim 1, wherein the varying of the write current includes toggling the write current on and off.

7. The process as recited in claim 1, wherein the signal amplitude is a track average amplitude.

8. The process as recited in claim 1, further comprising optimizing a channel that receives data from the read circuit for simulating a channel of a target drive.

9. The process as recited in claim 1, further comprising failing the read/write mechanism if the magnetoresistive impedance changes by a predetermined amount during the varying of the write current.

10. The process as recited in claim 1, further comprising repeating (a)–(d) for multiple cycles prior to (e) and (f).

11. A computer program product for testing a read/write mechanism having a read circuit and a write circuit, comprising:
   (a) computer code for varying a write current in the write circuit for exciting the write circuit;
   (b) computer code for measuring a magnetoresistive impedance of a read current of the read circuit;
   (c) computer code for measuring a signal amplitude of the read circuit;
   (d) computer code for measuring a bit error rate of the read circuit;
   (e) computer code for failing the read/write mechanism if the signal amplitude changes by a predetermined amount during the varying of the write current; and
   (f) computer code for failing the read/write mechanism if the error rate changes by a predetermined amount during the varying of the write current.

12. The computer program product as recited in claim 11, further comprising coupling the read/write mechanism to an external module, the external module being for sending write signals to the write circuit for varying the write current.

13. The computer program product as recited in claim 11, wherein the write current is varied at predetermined intervals based on a pattern.

14. The computer program product as recited in claim 11, wherein the write current is varied randomly.

15. The computer program product as recited in claim 11, further comprising changing a bias of the read circuit.

16. The computer program product as recited in claim 11, wherein the varying of the write current includes toggling the write current on and off.

17. The computer program product as recited in claim 11, wherein the signal amplitude is a track average amplitude.

18. The computer program product as recited in claim 11, further comprising computer code for optimizing a channel that receives data from the read circuit for simulating a channel of a target drive.

19. The computer program product as recited in claim 11, further comprising computer code for failing the read/write mechanism if the magnetoresistive impedance changes by a predetermined amount during the varying of the write current.

20. The computer program product as recited in claim 11, further comprising re-executing (a)–(d) multiple times prior to executing (e) and (f).

21. A module for testing a read/write mechanism having a read circuit and a write circuit, comprising:
   (a) a data coupling for coupling the module to the read/write mechanism;
   (b) a write signal generator for varying a write current in the write circuit of the read/write mechanism for exciting the write circuit;
   (c) a processor for measuring a magnetoresistive impedance of a read current of the read circuit of the read/write mechanism, the processor measuring a signal amplitude of the read circuit, the processor measuring a bit error rate of the read circuit;
   (d) wherein the processor fails the read/write mechanism if the signal amplitude changes by a predetermined amount during the varying of the write current; and
   (e) wherein the processor fails the read/write mechanism if the error rate changes by a predetermined amount during the varying of the write current.

22. A process for testing a read/write mechanism having a read circuit and a write circuit, comprising:
   (a) varying a write current in the write circuit of the read/write mechanism based on a pattern for exciting the write circuit, wherein the varying of the write current includes toggling the write current on and off;
   (b) measuring a magnetoresistive impedance of a read current of the read circuit of the read/write mechanism;
   (c) measuring a signal amplitude of the read circuit;
   (d) measuring an error rate of the read circuit;
   (e) changing a bias of the read circuit;
   (f) repeating (a)–(e) for multiple cycles;
   (g) failing the read/write mechanism if the signal amplitude changes by a predetermined amount during the varying of the write current;
   (h) failing the read/write mechanism if the error rate changes by a predetermined amount during the varying of the write current; and
   (i) failing the read/write mechanism if the magnetoresistive impedance changes by a predetermined amount during the varying of the write current.

* * * * *